United States Patent
Toratani et al.

(10) Patent No.: US 6,531,527 B2
(45) Date of Patent: Mar. 11, 2003

(54) VISCOSITY-STABILIZER-CONTAINING NATURAL RUBBER LATEX AND NATURAL RUBBER AND A PRODUCTION PROCESS THEREOF

(75) Inventors: Hirotoshi Toratani, Kodaira (JP); Ken Kijima, Kodaira (JP); Takatsugu Hashimoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/881,107

(22) Filed: Jun. 15, 2001

(65) Prior Publication Data

US 2002/0035195 A1 Mar. 21, 2002

(30) Foreign Application Priority Data

Jun. 15, 2000 (JP) ........................................ 2000-180409
Jun. 15, 2000 (JP) ........................................ 2000-180410

(51) Int. Cl.⁷ ................................................ C08K 5/00
(52) U.S. Cl. ..................................................... 524/191
(58) Field of Search .......................................... 524/191

(56) References Cited

U.S. PATENT DOCUMENTS 5,693,695 A * 12/1997 Toratani ...................... 524/217
5,710,200 A * 1/1998 Toratani ...................... 524/191
6,365,663 B2 * 4/2002 Mabry ......................... 524/495

FOREIGN PATENT DOCUMENTS

| JP | Hei 7-48404 | 2/1995 |
| JP | Hei 7-48405 | 2/1995 |
| JP | Hei 8-67703 | 3/1996 |

* cited by examiner

*Primary Examiner*—Edward J. Cain
(74) *Attorney, Agent, or Firm*—Sughrue Mion, PLLC

(57) ABSTRACT

A production process for a viscosity-stabilizer-containing natural rubber comprising a step of adding a viscosity stabilizer liquid diluted with a solvent to a natural rubber, and a viscosity-stabilizer-containing natural rubber latex to which added is a viscosity stabilizer dissolved in an aliphatic chain compound, and a viscosity-stabilizer-containing natural rubber obtained by adding a viscosity stabilizer liquid diluted with a solvent to a natural rubber after it was coagulated.

17 Claims, No Drawings

VISCOSITY-STABILIZER-CONTAINING NATURAL RUBBER LATEX AND NATURAL RUBBER AND A PRODUCTION PROCESS THEREOF

BACKGROUND OF THE INVENTION

1. Field of the Invention

The present invention relates to a viscosity-stabilizer-containing natural rubber latex and natural rubber which have an excellent viscosity stabilizing effect and a production process for a viscosity-stabilizer-containing natural rubber.

2. Description of the Related Art

In general, a natural rubber latex is produced in tropical countries such as Thailand, Malaysia and Indonesia. Natural rubber latices produced are subjected to treatments such as coagulating and drying to form natural rubbers and then the natural rubbers are classified according to species and grades.

A natural rubber is used widely in a large quantity in the rubber industry and the tire industry because of excellent physical properties thereof.

A natural rubber immediately after its production has a Mooney viscosity as low as 60 to 70, but the Mooney viscosity goes up to the vicinity of 90 to 100 during several months while it is stored and transported after the production (called storage hardening).

It is supposed that one of the causes of storage hardening of a natural rubber is attributable to the fact that a heterogeneous bond (an aldehyde group and the like) in an isoprene chain of a natural rubber is reacted with proteins and amino acids contained in a natural rubber, whereby cross-linking takes place to cause gelation (an increase in a gel quantity) (a mechanism thereof is not distinctly elucidated in literatures).

Gelation in a natural rubber deteriorates processability thereof. In general, a natural rubber has preferably a larger molecular weight from a viewpoint of physical properties, and a reduction in the molecular weight results in exerting an adverse effect on physical properties of the natural rubber. These molecular weight and gel quantity depend largely on the drying condition of the natural rubber after washed with water and the subsequent storing state of the natural rubber.

Known as viscosity stabilizers for preventing the storage hardening described above are hydroxylamine sulfate ($NH_2OH \cdot H_2SO_4$), semicarbazide ($NH_2NHCONH_2$), hydroxylamine, dimedone (1,1-dimethylcyclohexane-3,5-dione) and a hydrazide.

However, it is observed that when the respective compounds are used in a small amount, though varied depending on the compounds, a viscosity stabilizing effect is small from the beginning, or the viscosity is increased from a certain period, and therefore a problem resides in that the sufficient viscosity stabilizing effect has not yet been obtained.

On the other hand, the present applicant has applied a patent of a process for producing a natural rubber having a viscosity stabilizing effect by adding a viscosity stabilizer to a natural rubber immediately after dried (Japanese Patent Laid-Open No. Hei 7-48404, Japanese Patent Laid-Open No. Hei 7-48405 and Japanese Patent Laid-Open No. Hei 8-67703).

The production processes for a natural rubber which are disclosed in these official gazettes provide natural rubbers having an excellent viscosity stabilizing effect. In the production processes thereof, a viscosity stabilizer is added to a natural rubber without being diluted, and a problem resides in that dispersibility of the viscosity stabilizer added is not constant, so that a natural rubber latex or a natural rubber having an excellent viscosity stabilizing effect has not yet been obtained in a certain case.

It is disclosed in British Patent 1472064 to add a hydrazide compound which is emulsified using xylene as a solvent to a latex. However, aromatic compounds such as xylene are not preferred since an effect thereof exerted on human bodies and the environment is concerned.

The present invention is intended to solve the foregoing problems on conventional techniques, and an object of the present invention is to provide a natural rubber latex and a natural rubber which displays an excellent viscosity stabilizing effect, and a production process for a viscosity-stabilizer-containing natural rubber by further improving dispersibility of a viscosity stabilizer in them.

SUMMARY OF THE INVENTION

Intensive investigations repeated by the present inventors have resulted in finding that obtained are a natural rubber latex and a natural rubber which are excellent in a viscosity stabilizing effect by adding a specifically treated viscosity stabilizer which has good dispersibility and a good viscosity stabilizing effect to a natural rubber latex or a natural rubber up to immediately after drying (it may be added during drying), and researches further continued have resulted in successfully obtaining a production process for a natural rubber latex which meets the object described above and a viscosity stabilizer-containing natural rubber. Thus, the present invention has been completed.

That is, the present invention comprises the following items (1) to (17).

(1) A production process for a viscosity-stabilizer-containing natural rubber comprising a step of adding a viscosity stabilizer liquid diluted with a solvent to a natural rubber.

(2) The production process for a viscosity-stabilizer-containing natural rubber as described in the above item (1), wherein the natural rubber described above is a natural rubber latex.

(3) The production process for a viscosity-stabilizer-containing natural rubber as described in the above item (1), wherein the natural rubber described above is a natural rubber after it was coagulated.

(4) The production process for a viscosity-stabilizer-containing natural rubber as described in any of the above items (1) to (3), wherein the viscosity stabilizer liquid is an emulsion.

(5) The production process for a viscosity-stabilizer-containing natural rubber as described in the above item (3), wherein the viscosity stabilizer liquid is an organic solution or an aqueous solution.

(6) The production process for a viscosity-stabilizer-containing natural rubber as described in the above item (4), wherein the emulsion was prepared by further adding water to a viscosity stabilizer organic solution.

(7) The production process for a viscosity-stabilizer-containing natural rubber as described in any of the above items (1) to (6), wherein the solvent is an aliphatic chain compound.

(8) The production process for a viscosity-stabilizer-containing natural rubber as described in the above item (7), wherein the aliphatic chain compound described above is an aliphatic polyhydric alcohol.

(9) The production process for a viscosity-stabilizer-containing natural rubber as described in any of the above items (1) to (8), wherein the viscosity stabilizer described above is a hydrazide compound.

(10) The production process for a viscosity-stabilizer-containing natural rubber as described in the above item (9), wherein the hydrazide compound described above is represented by the following general Formula (I):

$$R\text{—}CONHNH_2 \qquad (I)$$

wherein R represents an alkyl group having 1 to 30 carbon atoms, a cycloalkyl group having 3 to 30 carbon atoms or an aryl group having 3 to 30 carbon atoms.

(11) The production process for a viscosity-stabilizer-containing natural rubber as described in the above item (10), wherein the viscosity stabilizer is at least one selected from the group consisting of acetohydrazide, propionohydrazide, butyrohydrazide, laurohydrazide, palmitohydrazide, stearohydrazide, cyclopropane carbohydrazide, cyclohexane carbohydrazide, cycloheptane carbohydrazide, benzohydrazide, o-toluohydrazide, m-toluohydrazide, p-toluohydrazide, p-methoxybenzohydrazide, 3,5-dimethylbenzohydrazide and 1-naphthohydrazide.

(12) The production process for a viscosity-stabilizer-containing natural rubber as described in the above item (4), wherein the viscosity stabilizer emulsion has a concentration of 3 to 50% by weight.

(13) The production process for a viscosity-stabilizer-containing natural rubber as described in the above item (5), wherein the viscosity stabilizer solution has a concentration of 20 to 80% by weight.

(14) A viscosity-stabilizer-containing natural rubber latex prepared by adding a viscosity stabilizer dissolved in an aliphatic chain compound.

(15) The viscosity-stabilizer-containing natural rubber latex as described in the above item (14), wherein the aliphatic chain compound is a polyhydric alcohol.

(16) A viscosity-stabilizer-containing natural rubber obtained from the natural rubber latex as described in the above item (14) or (15).

(17) A viscosity-stabilizer-containing natural rubber produced by the process as described in any of the above items (1) to (13).

DETAILED DESCRIPTION OF THE PREFERRED EMBODIMENTS

The embodiment of the present invention shall be explained below in detail.

The production process for a natural rubber of the present invention is characterized by comprising a step of adding a viscosity stabilizer liquid diluted with a solvent to a natural rubber. To be specific, it is characterized by comprising a step of adding a viscosity stabilizer liquid diluted with a solvent to a natural rubber in a production process for a natural rubber, that is, a production process for a natural rubber which in order comprises tapping (obtaining latex)—coagulating—washing (washing with water)—dehydrating—drying—packing.

Providing of the step of adding the viscosity stabilizer liquid makes it possible to improve dispersibility of the viscosity stabilizer to exert the excellent viscosity stabilizing effect even when insufficiently kneaded with a natural rubber.

There are a case where the viscosity stabilizer liquid is added directly to a natural rubber latex and a case where it is added to a natural rubber up to immediately after finishing a drying step after coagulating.

When adding the viscosity stabilizer solution to a natural rubber latex, which is the first embodiment, an aliphatic chain compound has to be used as a solvent.

Dissolving the viscosity stabilizer in the aliphatic chain compound makes it possible to improve dispersibility of the viscosity stabilizer without having an adverse effect on human bodies and the environment to provide a natural rubber latex with an excellent viscosity stabilizing effect and to inhibit gelation.

In this case, it does not matter whether the aliphatic chain compound is saturated or unsaturated and linear or branched. It may have at least one functional group such as a hydroxyl group and a carboxyl group in a molecule thereof.

To be specific, included are aliphatic hydrocarbons such as pentane, hexane and heptane and polyhydric alcohols such as ethylene glycol and propylene glycol. Among them, polyhydric alcohols are preferred.

In this embodiment, the viscosity stabilizer has a desirable content of 0.001 to 3% by weight, preferably 0.03 to 2.5% by weight, more preferably 0.05 to 1.5% by weight based on a solid substance contained in the natural rubber latex.

If the content described above is less than 0.001% by weight, the viscosity stabilizing effect may not be exerted in a certain case, and therefore such a content is not preferred. On the other hand, if it exceeds 3% by weight, the stabilizer may remain in the rubber composition in some cases, which results in bringing about the possibilities that the rubber composition is reduced in a low heat-generating property and/or durability and that dispersibility of carbon black and other compounding ingredients is lowered, and therefore such a content is not preferred.

In this embodiment, water can further be added to the viscosity stabilizer organic solution to prepare an emulsion. The viscosity stabilizer emulsion used in this embodiment can be obtained by a conventional method using an emulsifier and, if necessary, an affinitive agent.

In this embodiment, the viscosity stabilizer emulsion has desirably a concentration of 3 to 50% by weight, preferably 5 to 30% by weight.

If the concentration described above is less than 3% by weight, an amount of the viscosity stabilizer liquid required for adding a prescribed amount of the viscosity stabilizer becomes large. On the other-hand, if the concentration exceeds 50% by weight, stability of the liquid may be damaged in a certain case, and therefore such concentrations are not preferred. Further, the high viscosity stabilizing effect can be gained by setting a concentration of the emulsion to 3 to 50% by weight.

The natural rubber latex of this embodiment is obtained by blending a natural rubber latex with the viscosity stabilizer dissolved in the aliphatic chain compound or the viscosity stabilizer emulsion described above by means of a mixer.

When adding the viscosity stabilizer solution to a natural rubber up to immediately after finishing a drying step after coagulating, which is the second embodiment, a solvent can suitably be selected according to the characteristics of the viscosity stabilizer. When a hydrophilic viscosity stabilizer is used, water is used as the solvent. Water shall not specifically be restricted, and used is refined water such as ion-exchanged water and distilled water as well as non-refined water. When a lipophilic viscosity stabilizer is used, an aliphatic chain compound is preferably used for the same reasons as in the case of adding the viscosity stabilizer to a natural rubber latex. Further, an emulsion may be used like the case described above.

In this embodiment, the viscosity stabilizer emulsion can also be obtained by a conventional method using an emulsifier and, if necessary, an affinitive agent.

The viscosity stabilizer solution has preferably a concentration of 20 to 80% by weight, and the viscosity stabilizer emulsion has preferably a concentration of 3 to 50% by weight. If the concentrations described above are lower than the respective lower limits (if the concentration described above is less than 20% by weight for a solution or 3% by weight for an emulsion), an amount of the viscosity stabilizer liquid required for adding a prescribed amount of the viscosity stabilizer becomes large. On the other hand, if the concentration is higher than the respective higher limits (if the concentrations described above exceed 80% by weight for a solution or 50% by weight for an emulsion), brought about in a certain case may be problems that stability of the solution is damaged and that dispersibility of the stabilizer is reduced, and therefore such concentrations are not preferred.

An addition amount of the viscosity stabilizer solution to a natural rubber is preferably 0.002 to 150% by weight, more preferably 0.003 to 120% by weight based on the total amount of the natural rubber, and it is preferably 0.003 to 1000% by weight, more preferably 0.005 to 600% by weight in the case of the viscosity stabilizer emulsion.

A timing of adding the viscosity stabilizer shall not specifically be restricted as long as it is up to immediately after finishing a drying step after coagulating. It is preferably after finishing the washing step, because a loss of the viscosity stabilizer is small.

On the other hand, it is preferable that the viscosity stabilizer liquid is added to the natural rubber as soon as the treatment in the drying step described above is completed and kneaded. The natural rubber after drying is susceptible to gelation (storage hardening) even when left standing at room temperature, and therefore the viscosity stabilizer liquid should be added to the natural rubber as soon as the treatment in the drying step is completed even when it is stored over a long period of time.

The step of drying the natural rubber after its washing with water and dehydrating in the present invention can be conducted in one stage or in a multistage of two or more stages according to the species of natural rubber latices and the conditions of the rubbers after washing with water. The viscosity stabilizer may be added during this stage.

If the step of drying after washing with water and dehydrating is constituted by a multistage of two or more stages, not only the drying conditions in the respective stages can separately be set, but also a state of the rubber can be checked as well when the respective stages are finished, and therefore a drying condition in the subsequent stage can be suitably set, so that the rubber after drying is less varied in quality. In the drying step described above, drying in more stages is preferred rather to drying in a single stage in terms of maintaining the quality, but it tends to be increased in a cost.

A drying temperature in the drying step described above in the present invention is suitably set up according to the species and the grade of a natural rubber used (produced). When dried in a single stage, the temperature is preferably 100° C. or higher and 140° C. or lower. When dried in a multistage, the drying temperature in the respective stages is preferably within the range of 100° C. or higher and 140° C. or lower; the drying temperature in stages before the final stage is preferably within the range of 110° C. or higher and 140° C. or lower; and the drying temperature in the final stage is more preferably within the range of 100° C. or higher and 130° C. or lower.

Further, the drying time is suitably set up according to the species and the grade of a natural rubber used (produced) like the case described above. When dried in a single stage, it is preferably 200 minutes or shorter. When dried in a multistage, the drying time in stages before the final stage is 20 minutes or longer in total, and the total of the drying time in the first stage through the final stage is preferably 200 minutes or shorter.

A conventional machine used in a drying step of a natural rubber can be used as a drying machine used in the drying steps described above and includes, for example, an air dryer and a vacuum dryer.

In the case of the single stage or the multistage described above, if the drying temperature described above exceeds 140° C. in both cases, drying is likely to be advanced a lot, which may reduce the molecular weight. On the other hand, if it is lower than 100° C. in both cases, the drying time has to be set up longer, so that the gel quantity may be increased in a certain case.

If the drying time in stages before the final stage is shorter than 20 minutes in total in the case of the multistage described above, an effect of rough drying may not be satisfactory, and to be specific, a large amount of moisture stuck on the surface of water-washed crude rubber before a drying treatment step may not be sufficiently vaporized in a certain case. The total of the drying time in the first stage through the final stage is preferably set up to 200 minutes or shorter in order to inhibit the gelation, and if the total time exceeds 200 minutes, the gelation may not be able to be inhibited in some cases. Further, the drying temperature and the drying time in a stage in the case of the multistage described above shall not independently be set up respectively, and a state of the rubber can be checked at the time of finishing the respective stages to set up a drying condition in the subsequent stage. For example, when drying is considerably advanced in a certain stage, drying in the subsequent stages has to be set up to a relatively low temperature and a relatively short time.

In the production process for a viscosity-stabilizer-containing natural rubber of the present invention, strainer treatment may further be carried out after mixing of a natural rubber with a viscosity stabilizer. This provides a natural rubber which has a high molecular weight and is free of contaminants. The "strainer treatment" used here means treatment for removing contaminants contained in the viscosity-stabilizer-containing natural rubber by means of a meshy member.

The viscosity stabilizer used for the viscosity stabilizer liquid of the present invention includes, for example, hydroxylamine sulfate, semicarbazide, dimedone (1,1-dimethylcyclohexane-3,5-dione) and a hydrazide compound represented by the following general Formula (I):

$$R\text{—CONHNH}_2 \tag{I}$$

wherein R represents an alkyl group having 1 to 30 carbon atoms, a cycloalkyl group having 3 to 30 carbon atoms or an aryl group having 3 to 30 carbon atoms.

The hydrazide compound represented by Formula (I) described above includes, for example, acetohydrazide, propionohydrazide, butyrohydrazide, laurohydrazide, palmitohydrazide, stearohydrazide, cyclopropane carbohydrazide, cyclohexane carbohydrazide, cycloheptane carbohydrazide, benzohydrazide, o-toluohydrazide, m-toluohydrazide, p-toluohydrazide, p-methoxybenzohydrazide, 3,5-dimethylbenzohydrazide and 1-naphthohydrazide.

When the viscosity stabilizer described above is hydrophilic, it is added in the form of an aqueous solution, and when it is lipophilic, it is added in the form of an organic solution or an emulsion.

In the present invention, the viscosity stabilizer is preferably aliphatic carbohydrazide from a viewpoint of providing excellent dispersibility and further improved viscosity stabilizing effect. Among them, propionohydrazide as a hydrophilic hydrazide, and laurohydrazide as a lipophilic hydrazide are prefered.

In the present invention, the drying condition in the single stage or the respective stage in multistage can be set up according to the rubber state, as described above, in the drying step of the natural rubber after washing with water. Accordingly, in the drying step, gelation can be inhibited, and the molecular weight can be prevented from lowering.

The dried natural rubber which is treated in the drying step described above has preferably a molecular weight of 1,000,000 or more, more preferably 1,300,000 or more. If a molecular weight of the natural rubber is less than 1,000,000, the physical properties as a rubber composition may not be satisfactory in a certain case.

In the production process for a viscosity-stabilizer-containing natural rubber of the present invention, provided is a step of adding the viscosity stabilizer liquid diluted with a solvent to the natural rubber from after coagulated till immediately after dried, whereby the natural rubber having an excellent viscosity stabilizing effect which is the object of the present invention comes to be obtained.

By adding a viscosity stabilizer liquid to a natural rubber as described above, the viscosity stabilizer disperses into the natural rubber, and therefore it reacts with a heterogeneous bond (aldehyde group and the like) contained in the natural rubber to block the heterogeneous bond, whereby gelation in the natural rubber which causes storage hardening is inhibited to control an increase in the gel quantity, so that the natural rubber having an excellent viscosity stabilizing effect comes to be obtained.

The viscosity-stabilizer-containing natural rubber latex of the present invention is obtained by adding the viscosity stabilizer dissolved in the aliphatic chain compound or the viscosity stabilizer emulsion. In the thus constituted natural rubber latex of the present invention, the viscosity stabilizer which is dissolved in the aliphatic chain compound and excellent in dispersibility and a viscosity stabilizing effect is added, and therefore the excellent viscosity stabilizing effect is provided to the natural rubber latex. In addition thereto, gelation after drying is inhibited, so that the natural rubber having a high molecular weight is obtained.

The viscosity-stabilizer-containing natural rubber of the present invention is obtained by adding the viscosity stabilizer to a natural rubber from the time of being latex till immediately after dried by the method described above.

The viscosity-stabilizer-containing natural rubber of the present invention obtained through the steps described above can be blended, if necessary, with optional components such as a filler, a reinforcing agent, a softening agent, a vulcanizing agent, a vulcanization-accelerator, an accelerator activator and an antioxidant, which are conventionally used in the rubber industry.

EXAMPLES

The present invention shall more specifically be explained in details with reference to examples and comparative examples, but the present invention shall not be restricted to the examples described below.

Examples 1 to 3 and Comparative Examples 1 to 2
Preparation of Viscosity Stabilizer-containing Natural Rubber Latex Viscosity stabilizers shown in the following Table 1 were added in the form of an emulsion (Examples) or an aqueous solution (Comparative Example) to a natural rubber latex after tapping to obtain viscosity-stabilizer-containing natural rubber latices.

The resulting viscosity-stabilizer-containing natural rubber latices were evaluated for a foreign matter amount by the following evaluation method.

The results thereof are shown in the following Table 1.
Drying Step and Preparation of Viscosity-stabilizer-containing Natural Rubbers Next, the viscosity stabilizer-containing natural rubber latices obtained above were dried under the drying treatment conditions shown below by means of an air dryer (Geer Oven manufactured by Ueshima Seisakusho Co., Ltd.) as a drying machine.
Drying Conditions The latices were dried under the drying conditions shown in the following condition (1) or (2).
Drying Treatment Conditions (1) Examples 1 and 3 and Comparative Examples 1 and 2

Drying treatment was carried out in a single stage under the conditions described below:

Drying temperature: 120° C. drying time: 120 minutes (2) Example 2

Drying treatment was carried out in two stages under the conditions described below:

Drying temperature: 120° C. in the first stage and 110° C. in the second stage

Drying time: 60 minutes in the first stage and 60 minutes in the second stage

In two stage drying treatment, drying treatment was carried out at the drying temperature and time described above in the first drying chamber in the first stage, and the natural rubber treated in the first drying chamber was moved to the second drying chamber in the second stage and treated at the drying temperature and time described above.

The respective natural rubbers thus obtained were evaluated for a viscosity stabilizing effect and a molecular weight by the following evaluation methods.

The results thereof are shown in the following Table 1.

Examples 4 to 9 and Comparative Examples 3 to 6
Drying Conditions

Coagulated substances of latex (obtained by pelletizing USS coagulated in the form of a sheet) were dried on the drying treatment conditions shown in the following items (1) and (2) by means of the air dryer (Geer Oven manufactured by Ueshima Seisakusho Co., Ltd.) as a drying machine.
Drying Treatment Conditions (1) Examples 4 to 5 and 7 to 9 and Comparative Examples 3 to 6

Drying treatment was carried out in a single stage under the conditions described below:

Drying temperature: 120° C., drying time: 120 minutes (2) Example 6

Drying treatment was carried out in two stages under the conditions described below:

Drying temperature: 120° C. in the first stage and 110° C. in the second stage

Drying time: 60 minutes in the first stage and 60 minutes in the second stage

In two stage drying treatment, drying treatment was carried out at the drying temperature and time described above in the first drying chamber in the first stage, and the natural rubber treated in the first drying chamber was moved to the second drying chamber in the second stage and treated at the drying temperature and time described above.

The natural rubbers treated on the respective drying conditions described above were cooled to 30° C., and then these natural rubbers were put into a kneader (pre-breaker), followed by adding viscosity stabilizer liquids (added components) shown in the following Table 2 and kneading for one minute.

The respective natural rubbers thus obtained were evaluated for a viscosity stabilizing effect by the following evaluation method.

The results thereof are shown in the following Table 2.

Evaluation Method of Viscosity Stabilizing Effect

Measured based on JIS K 6300-1994 were the Mooney viscosity: ML1+4 (ORI) at 100° C. immediately after produced and the Mooney viscosity: ML1+4 (AGED) at 100° C. after storing the natural rubbers in an oven of 60° C. for 7 days, and a difference therebetween, [ML1+4 (AGED)]–[ML1+4 (ORI)], was determined as a viscosity stabilizing effect.

In the respective examples and comparative examples, the steps of production of the viscosity-stabilizer-containing natural rubber latices and natural rubbers and the evaluation tests were carried out 5 times in each Example and Comparative Example to obtain the average values.

It is shown that the lower the value in the result of the evaluation method described above, the higher the viscosity stabilizing effect and that the smaller the standard deviation ($\sigma$) the better the viscosity stabilizing effect.

Evaluation Method of Molecular Weight

The molecular weight was measured by a gel permeation chromatography, wherein Gel Permeation Chromatograph HCL-8020 manufactured by Tosoh Corporation was used as the measuring instrument; GMHXL manufactured by Tosoh Corporation was used as the column; standard polystyrene manufactured by Tosoh Corporation was used for calibration; THF extra grade was used as the carrier; and 0.01 g sample/30 ml THF was used as the sample solution.

Evaluation Method of Foreign Matter Amount

Measured based on ISO 249-1987.

TABLE 1

|  | Comparative Example | | Example | | |
| --- | --- | --- | --- | --- | --- |
|  | 1 | 2 | 1 | 2 | 3 |
| No chemical (USS/Cl raw material)*[1] | ◯ | — | — | — | — |
| Addition of PHZ aqueous solution to latex (phr) | — | ◯*[2] 0.2 | — | — | — |
| Addition of LHZ emulsion to latex (phr) | — | — | ◯*[3] 2.3 | ◯*[4] 0.5 | ◯*[5] 4.6 |
| Viscosity stabilization effect |  |  |  |  |  |
| 1 | 13.0 | 9 | 2.1 | 1.7 | 2.4 |
| 2 | 12.9 | 7.5 | 2.1 | 1.6 | 2.2 |
| 3 | 10.3 | 6.5 | 1.3 | 1.5 | 1.4 |
| 4 | 9.2 | 6 | 1.0 | 1.0 | 1.2 |
| 5 | 8.5 | 5.5 | 0.7 | 0.6 | 0.8 |
| Average | 10.8 | 6.9 | 1.4 | 1.3 | 1.6 |
| Standard deviation ($\sigma$) | 2.1 | 1.4 | 0.6 | 0.5 | 0.7 |
| Molecular weight (unit: ten thousand) | 168 | 178 | 175 | 185 | 172 |
| Foreign matter amount (%) | 0.12 | 0.03 | 0.03 | 0.03 | 0.03 |

PHZ: Propionohydrazide
LHZ: Laurohydrazide
*[1]No chemical is used
*[2]50 wt% aqueous solution of PHZ
*[3]10 wt% LHZ in emulsion
*[4]50 wt% LHZ in emulsion
*[5]5 wt % LHZ in emulsion Emulsions: Prepared with condenced product of phenol sulfonic acid and formaldehyde, propylene glycol and water, wherein the condensed product and propylene glycol are used in an equal amount.

TABLE 2

|  | Comparative Example 3 | Comparative Example 4 | Example 4 | Example 5 | Example 6 | Example 7 | Comparative Example 5 | Comparative Example 6 | Example 8 | Example 9 |
|---|---|---|---|---|---|---|---|---|---|---|
| Viscosity*1 Stabilizer (concentration) | | | | | | | | | | |
| PHZ |  | 100 | 80 | 50 | 50 | 20 |  |  |  |  |
| LHZ |  |  |  |  |  |  |  | 100 | 10 | 30 |
| Water | 100 |  | 20 | 50 | 50 | 80 |  |  |  |  |
| Emulsion |  |  |  |  |  |  | 100 |  | 90 | 70 |
| Viscosity stabilization effect | | | | | | | | | | |
| 1 | 13.5 | 6.0 | 2.6 | 1.9 | 1.5 | 2.5 | 13.5 | 7.0 | 2.2 | 2.5 |
| 2 | 10.5 | 4.5 | 2.0 | 1.5 | 1.3 | 2.2 | 10.9 | 5.5 | 2.2 | 2.4 |
| 3 | 9.9 | 4.1 | 1.9 | 0.9 | 0.8 | 2.1 | 10.3 | 4.9 | 1.5 | 2.3 |
| 4 | 9.2 | 1.5 | 1.5 | 0.8 | 0.7 | 1.5 | 8.5 | 2.5 | 1.3 | 1.5 |
| 5 | 8.7 | 1.1 | 0.8 | 0.5 | 0.4 | 0.9 | 8.1 | 1.6 | 0.9 | 0.9 |
| Average value | 10.8 | 3.4 | 1.8 | 1.1 | 0.9 | 1.7 | 10.3 | 4.3 | 1.6 | 1.9 |
| Standard deviation σ | 1.9 | 2.1 | 0.7 | 0.6 | 0.5 | 0.6 | 2.2 | 2.2 | 0.6 | 0.7 |

*1 added 0.2 phr as the viscosity stabilizer
PHZ: Propionohydrazide
LHZ: Laurohydrazide
Emulsion: Prepared with condensed product of phenol sulfonic acid and formaldehyde, propylene glycol and water, wherein the condensed product and propylene glycol are used in an equal amount.

As apparent from the results shown in Tables 1 and 2 described above, it has been found that the viscosity stabilizing effects are excellent in Examples 1 to 9 which fall within the scope of the present invention as compared with Comparative Examples 1 to 6 which fall outside the scope of the present invention. Particularly, it has been found that the viscosity stabilizing effect is further excellent in Examples 2 and 6 in which the natural rubbers were dried in two stages. Further, the standard deviation is large in Comparative Examples.

What is claimed is:

1. A production process for a viscosity-stabilizer-containing natural rubber comprising a step of adding a viscosity stabilizer liquid diluted with a solvent to a natural rubber.

2. The production process for a viscosity-stabilizer-containing natural rubber as described in claim 1, wherein the natural rubber described above is a natural rubber latex.

3. The production process for a viscosity-stabilizer-containing natural rubber as described in claim 1, wherein the natural rubber described above is a natural rubber after it was coagulated.

4. The production process for a viscosity-stabilizer-containing natural rubber as described in claim 1, wherein the viscosity stabilizer liquid is an emulsion.

5. The production process for a viscosity-stabilizer-containing natural rubber as described in claim 3, wherein the viscosity stabilizer liquid is an organic solution or an aqueous solution.

6. The production process for a viscosity-stabilizer-containing natural rubber as described in claim 4, wherein the emulsion was prepared by further adding water to a viscosity stabilizer organic solution.

7. The production process for a viscosity-stabilizer-containing natural rubber as described in claim 1, wherein the solvent is an aliphatic chain compound.

8. The production process for a viscosity-stabilizer-containing natural rubber as described in claim 7, wherein the aliphatic chain compound described above is an aliphatic polyhydric alcohol.

9. The production process for a viscosity-stabilizer-containing natural rubber as described in claim 1, wherein the viscosity stabilizer described above is a hydrazide compound.

10. The production process for a viscosity-stabilizer-containing natural rubber as described in claim 9, wherein the hydrazide compound described above is represented by the following general Formula (I):

$$R-CONHNH_2 \quad (I)$$

wherein R represents an alkyl group having 1 to 30 carbon atoms, a cycloalkyl group having 3 to 30 carbon atoms or an aryl group having 3 to 30 carbon atoms.

11. The production process for a viscosity-stabilizer-containing natural rubber as described in claim 10, wherein the viscosity stabilizer is at least one selected from the group consisting of acetohydrazide, propionohydrazide, butyrohydrazide, laurohydrazide, palmitohydrazide, stearohydrazide, cyclopropane carbohydrazide, cyclohexane carbohydrazide, cycloheptane carbohydrazide, benzohydrazide, o-toluohydrazide, m-toluohydrazide, p-toluohydrazide, p-methoxybenzohydrazide, 3,5-dimethylbenzohydrazide and 1-naphthohydrazide.

12. The production process for a viscosity-stabilizer-containing natural rubber as described in claim 4, wherein the viscosity stabilizer emulsion has a concentration of 3 to 50% by weight.

13. The production process for a viscosity-stabilizer-containing natural rubber as described in claim 5, wherein the viscosity stabilizer solution has a concentration of 20 to 80% by weight.

14. A viscosity-stabilizer-containing natural rubber latex prepared by adding a viscosity stabilizer dissolved in an aliphatic chain compound.

15. The viscosity-stabilizer-containing natural rubber latex as described in claim 14, wherein the aliphatic chain compound is a polyhydric alcohol.

16. A viscosity-stabilizer-containing natural rubber obtained from the natural rubber latex as described in claim 14.

17. A viscosity-stabilizer-containing natural rubber produced by the process as described in claim 1.

* * * * *